(12) United States Patent
Picco et al.

(10) Patent No.: US 7,660,366 B2
(45) Date of Patent: Feb. 9, 2010

(54) MESSAGE SYNCHRONIZATION OVER A STOCHASTIC NETWORK

(75) Inventors: Martin Raptis Picco, Santa Cruz, CA (US); Noam Koren, Haniel (IL)

(73) Assignee: Harmonic Inc., Sunnyvale, CA (US)

( * ) Notice: Subject to any disclaimer, the term of this patent is extended or adjusted under 35 U.S.C. 154(b) by 894 days.

(21) Appl. No.: 10/931,178

(22) Filed: Aug. 30, 2004

(65) Prior Publication Data

US 2006/0045020 A1    Mar. 2, 2006

(51) Int. Cl.
*H03D 3/18* (2006.01)
(52) U.S. Cl. .................. 375/327; 375/354; 375/358; 375/373; 375/376; 370/229; 370/230
(58) Field of Classification Search .............. 375/327, 375/354–358, 373–376; 370/229–235
See application file for complete search history.

(56) References Cited

U.S. PATENT DOCUMENTS

| | | | |
|---|---|---|---|
| 5,861,919 A | | 1/1999 | Perkins et al. |
| 5,991,307 A | * | 11/1999 | Komuro et al. ............. 370/473 |
| 6,192,083 B1 | | 2/2001 | Linzer et al. |
| 7,130,368 B1 | * | 10/2006 | Aweya et al. ............... 375/376 |
| 2002/0181459 A1 | * | 12/2002 | Ohta et al. ................... 370/389 |
| 2003/0095508 A1 | * | 5/2003 | Kadous et al. .............. 370/252 |
| 2003/0124988 A1 | * | 7/2003 | Bae et al. ....................... 455/88 |
| 2004/0253996 A1 | * | 12/2004 | Chen et al. .................. 455/574 |

* cited by examiner

*Primary Examiner*—Curtis B Odom
(74) *Attorney, Agent, or Firm*—Fish & Richardson P.C.

(57) ABSTRACT

Methods and apparatus to communicate between a local component and a remote component, where the local component is connected to the remote component using a non-deterministic communication link. A local clock is synchronized with a remote clock to within a maximum offset. A rate message from the remote component is received at the local component, where the rate message includes a first time stamp. A data rate is adjusted using the rate message when the time of the local clock substantially matches a time determined using the first time stamp. A data message is sent to the remote component using the adjusted data rate, where the data message includes a second time stamp for use in processing data in the data message. In some implementations, the time determined using the first time stamp is also determined using information about a communication link delay and/or a clock offset.

42 Claims, 3 Drawing Sheets

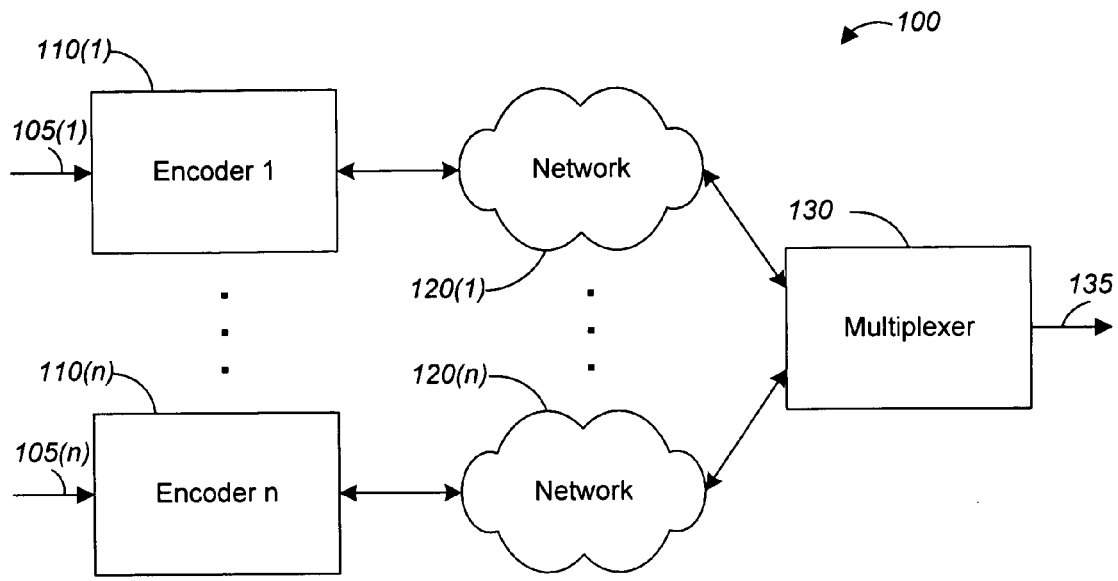
FIG._1
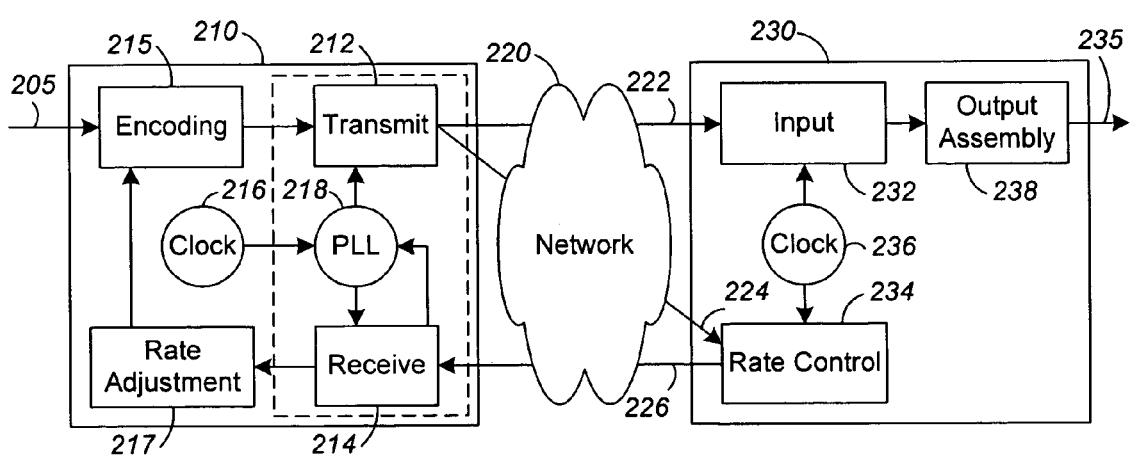
FIG._2

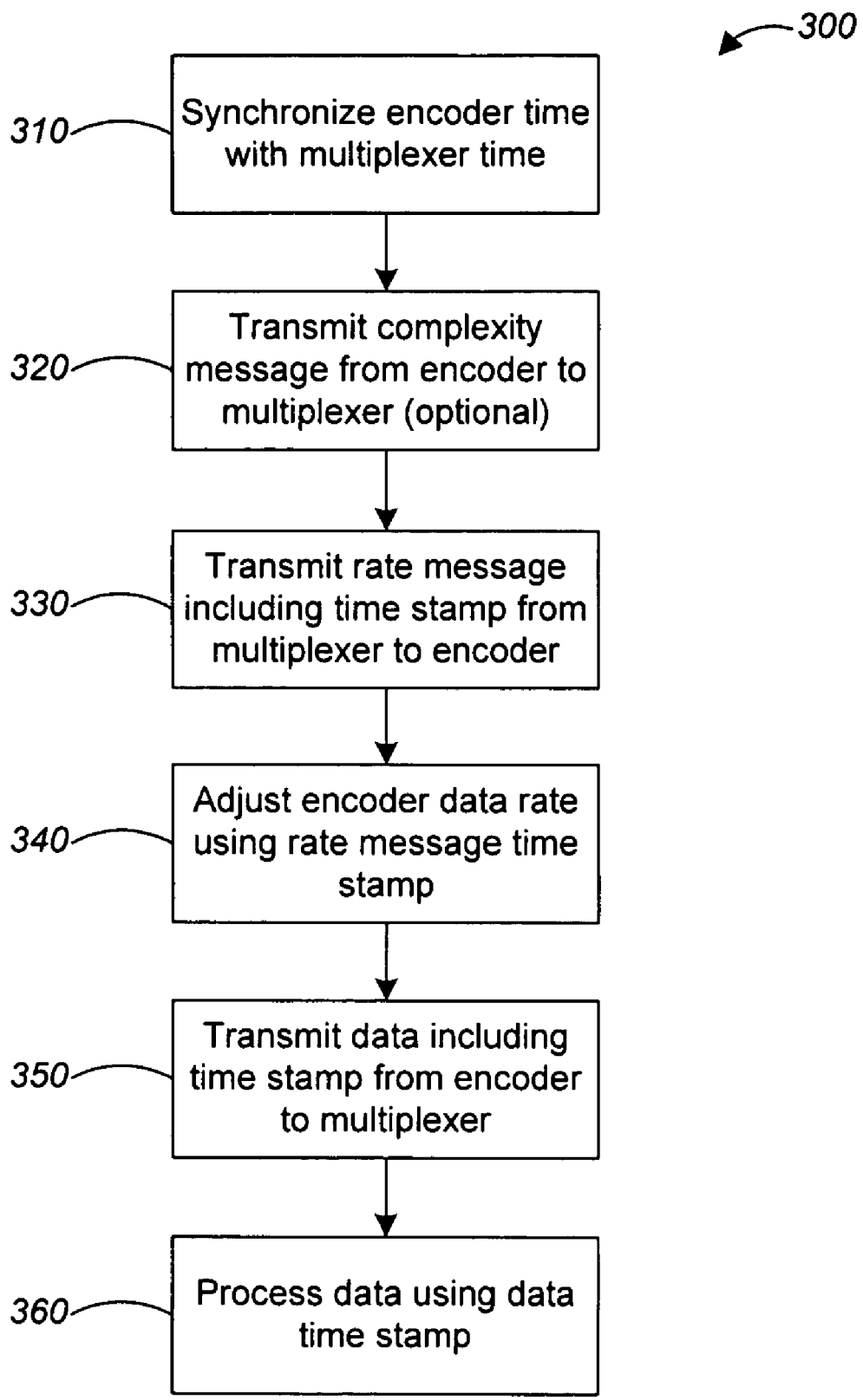
FIG._3

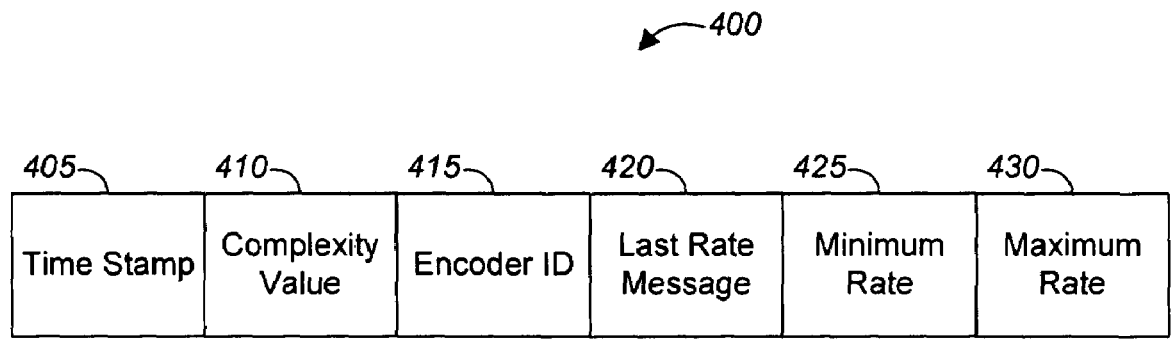
FIG._4A
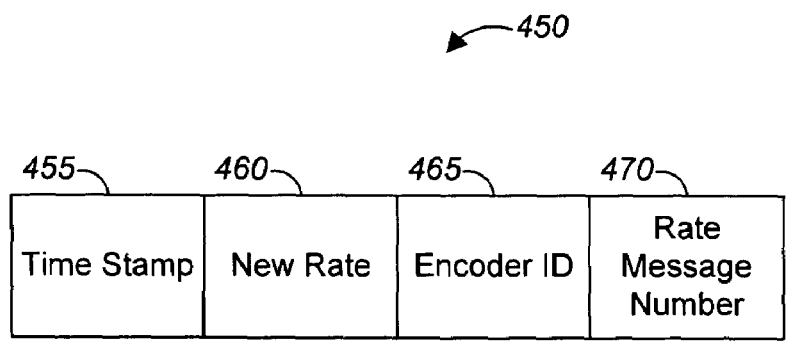
FIG._4B

MESSAGE SYNCHRONIZATION OVER A STOCHASTIC NETWORK

BACKGROUND

The following disclosure relates to network communication.

In some communication systems, components need to adjust transmission parameters such as data rates or packet sizes during operation. In one possible scenario, a multiplexer that is connected to multiple variable bitrate encoders (e.g., in an MPEG-based video transmission system) may be configured to instruct the encoders to transmit data at a specific rate. For example, a multiplexer that delivers a constant bitrate stream to subscribers can instruct encoders to send at bitrates that correspond to the complexity of the signal that is being encoded, while ensuring that the sum of the individual encoder bitrates is not greater than the constant bitrate that the multiplexer has to provide. In this scenario, it is important that the encoders change transmission parameters when requested to do so such that data transmitted with the changed parameters from the multiple encoders can be multiplexed together. If, for example, one of the encoders did not reduce the bitrate of the encoded data for a frame, more bits might arrive at the multiplexer for the frame than the multiplexer could place in the constant-bitrate output stream. Such systems, in which high-precision synchronization is desirable, typically use a deterministic connection (e.g., a connection with a constant or predictable delay) for communication so that messages can be synchronized using deterministic delays.

Components in a communication system can be connected using a stochastic (non-deterministic) network (e.g., a packet-based network using the internet protocol). A delay between the transmission of a message over a stochastic network and the receipt of the message typically is a random variable, so message synchronization can be difficult. Upper and lower bounds on the delay typically can be determined. For some stochastic networks, the upper bound on delay can be infinite (e.g., a packet can be lost and never arrive at the packet's destination), and for other stochastic networks the upper bound on delay can be finite.

SUMMARY

In one aspect, a method is provided for communicating between a local component and a remote component, where the local component is connected to the remote component using a non-deterministic communication link. A local clock of the local component is synchronized with a remote clock of the remote component to within a maximum offset. A rate message from the remote component is received at the local component, where the rate message includes a first time stamp. A data rate of the local component is adjusted using the rate message when the time of the local clock substantially matches a time determined using the first time stamp. A data message is sent from the local component to the remote component using the adjusted data rate, where the data message includes a second time stamp for use in processing data in the data message.

Particular implementations may include one or more of the following features. A complexity message is transmitted from the local component to the remote component, and the rate message is produced using the complexity message. Adjusting the data rate includes determining the first time of the local clock using a phase-locked loop or statistically estimating the first time of the local clock. The time determined using the first time stamp is further determined using information about a communication link delay and/or information about an offset between the local clock and a remote clock. The information about an offset includes information about a maximum offset, which can include a maximum positive offset and a maximum negative offset. The information about a communication link delay includes information about a maximum communication link delay between the local component and the remote component, which can include information about a delay from the remote component to the local component and information about a delay from the local component to the remote component.

The first time stamp includes the information about the communication link delay and/or the information about the offset between the local clock and the remote clock. The second time stamp includes information about the communication link delay and/or information about the offset between the local clock and the remote clock. Adjusting a data rate includes queuing rate information included in the rate message. The rate message is buffered until the first time of the local clock substantially matches the time determined using the first time stamp.

In another aspect, a method is provided for communicating between a local component and a remote component, where the local component is connected to the remote component using a non-deterministic communication link, and a local clock of the local component is synchronized with a remote clock of the remote component to within a maximum offset. A rate message is sent from the local component to the remote component. The rate message includes a first time stamp that is used by the remote component to send a data message to the local component using a data rate included in the rate message when a first time of a remote clock substantially matches a time determined using the first time stamp. The data message is received at the local component, where the data message includes a second time stamp. Data included in the data message is processed using the second time stamp.

Particular implementations may include one or more of the following features. A complexity message is received from the remote component, and the rate message is generated using the complexity message. The data included in the data message is processed when a second time of a local clock substantially matches a time determined using the second time stamp. The time determined using the second time stamp is further determined using information about a communication link delay and/or information about an offset between the local clock and the remote clock. The information about the offset includes information about a maximum offset, which can include information about a maximum positive offset and a maximum negative offset.

The information about a communication link delay includes information about a maximum communication link delay between the local component and the remote component, which can include information about a delay from the remote component to the local component and information about a delay from the local component to the remote component. The second time stamp includes the information about the communication link delay and/or the information about the offset between the local clock and the remote clock. The first time stamp includes information about the communication link delay and/or information about the offset between a local clock and the remote clock. Processing data included in the data message includes buffering the data message until a time of the local clock substantially matches a time determined using the second time stamp.

In another aspect, a method is provided for communicating between a local component and a remote component. A non-deterministic communication link connecting the local component to the remote component is provided. A local clock of the local component is synchronized with a remote clock of the remote component to within a maximum offset. A rate message is sent from the remote component to the local component, where the rate message includes a first time stamp. A data rate of the local component is adjusted using the rate message when a first time of the local clock substantially matches a time determined using the first time stamp, information about a communication link delay, and information about the maximum offset. A data message is sent at the first time from the local component to the remote component using the adjusted data rate, where the data message includes a second time stamp. Data included in the data message is processed when a second time of the remote clock substantially matches a time determined using the second time stamp, information about the communication link delay, and information about the maximum offset.

Particular implementations may include one or more of the following features. The local component is an encoder and the remote component is a multiplexer. A complexity message is transmitted from the local component to the remote component, where the rate message is produced using the complexity message.

In one aspect, a local component is provided that is connected to a remote component using a non-deterministic communication link. The local component includes means for synchronizing a local clock of the local component to a remote clock of the remote component to within a maximum offset and means for adjusting a data rate of the local component using a rate message from the remote component. The local component also includes means for guaranteeing that a data message sent from the local component to the remote component will arrive at the remote component in time to be processed by the remote component.

Particular implementations may include one or more of the following features. The means for synchronizing include a phase-locked loop. The means for synchronizing include statistical estimation. The means for adjusting include a rate adjustment unit. The means for guaranteeing include a time-stamping component.

In another aspect, a multiplexer is provided that includes an output assembly unit, which assembles data into an output stream. An input unit receives a data message including data and a time stamp and provides the data to an output assembly unit when a time of a local clock substantially matches a time determined using the time stamp. A rate control unit sends a time-stamped rate message to a remote component, where the rate message includes information about a data rate of a future data message.

Particular implementations may include one or more of the following features. The rate control unit generates the rate message using information about a complexity of the future data message. The rate control unit timestamps the rate message using information about the time of the local clock. The input unit provides the data to the output assembly unit using information about a communication link delay and/or information about an offset between the local clock and a remote clock.

In another aspect, an encoder is provided that includes a synchronization unit, which synchronizes an encoder clock with a remote clock to within a maximum offset. A transmitter time stamps and transmits a data message at a data rate, and a rate adjustment unit adjusts the data rate responsive to a corresponding rate message when a time of the encoder clock substantially matches a time determined using a time stamp in the corresponding rate message.

Particular implementations may include one or more of the following features. The synchronization unit includes a phase-locked loop. The transmitter time stamps the data message using information about the time of the encoder clock. The rate adjustment unit adjusts the data rate using information about a communication link delay and/or information about the maximum offset. The transmitter transmits a timestamped complexity message that is used to generate the corresponding rate message.

Implementations can include one or more of the following advantages. Methods and apparatus are disclosed that can be used to allow communication components to synchronize messages accurately using a stochastic network. Systems or components designed to communicate over a deterministic network can be configured to allow communication over the stochastic network. Components in a communication system can be located remotely without being directly connected using a dedicated communication link. Connections between components in the communication system can be changed dynamically without requiring rewiring. A small pool of backup devices can be used in the communication system because the connections can be changed dynamically and are very flexible. Variations in message delivery times can be kept small, even when using a stochastic network having large delays and/or large variations in delay.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of a communication system.
FIG. 2 is a block diagram of an encoder and a multiplexer.
FIG. 3 is a flowchart of a process for synchronizing messages.
FIG. 4A shows a format of a complexity message.
FIG. 4B shows a format of a rate message.
Like reference symbols in the various drawings indicate like elements.

DETAILED DESCRIPTION

FIG. 1 shows a communication system 100 in which multiple encoders 110(1)-110(n) are connected to a multiplexer 130 using networks 120(1)-120(n). Encoders 110(1)-110(n) can be, for example, audio or video encoders that receive and encode input signals 105(1)-105(n) for transmission. Encoders 110(1)-110(n) typically can encode and transmit data at multiple bitrates. The bitrate an encoder uses to encode a signal can be varied based on, for example, the complexity of the signal, the available bandwidth in an output channel, or the quality desired or required for the encoded signal.

Encoders 110(1)-110(n) transmit encoded data over networks 120(1)-120(n) to multiplexer 130. Networks 120(1)-120(n) can be stochastic networks (e.g., internet protocol (IP) networks) having a variable transmission delay. In one implementation, networks 120(1)-120(n) are part of a same network.

Multiplexer 130 receives encoded data from encoders 110(1)-110(n) and can combine the encoded data into a single output stream 135, which can be a constant bitrate stream. Multiplexer 130 typically has a target bitrate for output stream 135, which can be constrained, for example, by a capacity of a channel over which output stream 135 is sent or by limitations of a device that receives output stream 135.

Multiplexer 130 can provide encoders 110(1)-110(n) with rate messages that instruct each respective encoder to transmit encoded data at a specific bitrate. Multiplexer 130 can determine what rate to instruct an encoder to transmit at based on, for example, the past history of the encoded data from the encoder, a complexity message provided by the encoder, or operator input. A complexity message from an encoder can include an estimate of a required bitrate to encode the input signal at a given level of quality. A complexity message also can include a statistic or group of statistics about the current input signal or a future input signal that multiplexer 130 can use to allocate a bitrate to the encoder.

Multiplexer 130 can allocate bitrates to encoders 110(1)-110(n) to optimize the quality of the signals from encoders 110(1)-110(n) while keeping output signal 135 within a required bitrate. Multiplexer 130 can send rate messages to encoders 110(1)-110(n) at a preset rate or at a less regular interval. If multiplexer 130 sends rate messages to encoders 110(1)-110(n), it is desirable for encoders 110(1)-110(n) to change bitrates such that the encoded data from encoders 110(1)-110(n) that is transmitted with the new bitrate arrives at multiplexer 130 in time to be placed together in output stream 135. If encoded data from an encoder transmitting at an old bitrate is multiplexed with encoded data from encoders transmitting at a new bitrate, output stream 135 may be under-subscribed (have fewer bits to transmit than are available) or may be over-subscribed (have more bits to transmit than are available).

FIG. 2 shows an encoder/multiplexer pair 200 where an encoder 210 and a multiplexer 230 are connected by a network 220. Multiplexer 230 typically is connected to multiple encoders, but only encoder 210 is shown for clarity. Network 220 can be a single network or can consist of multiple independent networks. Encoder 210 includes a transmitter 212, a receiver 214, an encoding unit 215, and a rate adjustment unit 217. Multiplexer 230 includes an input unit 232, a rate control unit 234, and an output assembly unit 238.

Encoder 210 receives an input signal 205 (e.g., uncompressed analog or digital audio, video, or data), encodes input signal 205 using encoding unit 215, and transmits an encoded data message 222 using transmitter 212. Data message 222 typically is encoded with a variable bitrate and can be, for example, a stream of data or a series of discrete packets of data. In the implementation shown, an encoder time (e.g., indicated by an encoder clock 216) is synchronized with a multiplexer clock 236 to within a maximum offset using a phase-locked loop (PLL) 218. PLL 218 can use encoder clock 216 as a base frequency and information about a time of multiplexer clock 236 (e.g., included in a rate message time stamp as discussed below or in a separate timing message) as a frequency reference for synchronization. In another implementation, the encoder time base can be synchronized with multiplexer clock 236 using statistical methods instead of using PLL 218. One such statistical method uses observed network delay to predict future behavior and estimate the arrival time of packets. Alternatively, a variation of the Network Time Protocol can be used for synchronization.

In one implementation, encoder 210 can transmit a complexity message 224 to rate control unit 234, and rate control unit 234 can transmit a rate message 226 to encoder 210 that specifies a bitrate that encoder 210 should use to produce data message 222. Rate adjustment unit 217 can process rate message 226 and instruct encoding unit 215 to encode input signal 205 using the new rate. Complexity message 224 can indicate how easily encoding unit 215 can encode the information in input signal 205. Complexity message 224 can explicitly state a bitrate or number of bits that will be required to encode input signal 205 at a given level of quality. Complexity message 224 can include one or more statistics about input signal 205 (e.g., sample variance or mean) and/or perceptual information about input signal 205. Complexity message 224 can also include a time stamp including, for example, information about the time (e.g., the time indicated by PLL 218) at which complexity message 224 is sent. The complexity message time stamp can be added to the complexity message 224 by transmitter 212 and can include information about a time at which multiplexer 230 should process and/or use complexity message 224. Multiplexer 230 can process complexity messages from multiple encoders at a set rate (e.g., 32 times per second). For example, multiplexer 230 can process all complexity messages that have arrived by a given time (indicated by multiplexer clock 236) without regard to whether complexity messages are available for all of the encoders. If a complexity message isn't available for an encoder, the last complexity information for the encoder can be reused. In one implementation, complexity message 224 is not used, and rate information can be determined, for example, based on a history of data message 222.

FIG. 4A shows a format of an illustrative complexity message 400 that includes fields 405-430. Each field can be, for example, a 32-bit unsigned integer. Field 405 is a time stamp of complexity message 400, and field 410 is a complexity value, both of which were discussed above. Field 415 specifies an ID of an encoder (e.g., encoder 210 in FIG. 2) with which complexity message 400 is associated. Field 420 identifies a last rate message that the encoder received before sending complexity message 400. Fields 425 and 430 indicate a minimum rate and a maximum rate, respectively, at which the encoder can transmit.

Referring again to FIG. 2, rate control unit 234 sends rate message 226 to encoder 210. Rate message 226 can include information about a bitrate and/or number of bits that encoder 210 should use to encode input signal 205, and transmit data message 222, in the future. In one implementation, multiplexer 230 can send a broadcast rate message to multiple encoders, and the broadcast rate message can include individual bitrates for each encoder or a single bitrate that all of the encoders should use. Rate message 226 includes a time stamp that can contain information about a time of multiplexer clock 236. For example, the rate message time stamp can be generated by rate control unit 234 and can indicate the time (as indicated by multiplexer clock 236) at which rate control unit 234 transmits rate message 226. The rate message time stamp can include information about a time at which encoder 210 should process and/or use rate message 226.

FIG. 4B shows a format of an illustrative rate message 450 that includes fields 455-470. Field 455 is a time stamp of rate message 450, and field 460 is a new rate for an encoder (e.g., encoder 210 in FIG. 2), both of which were discussed above. Field 465 specifies an ID of the encoder that should process rate message 450. Field 470 is a number of rate message 450. For example, rate messages can be numbered sequentially.

Referring again to FIG. 2, encoder 210 transmits data message 222 using rate information from rate message 226. More specifically, receiver 214 buffers rate message 226 and provides rate message 226 to rate adjustment unit 217 at a specific time (e.g., when a time indicated by PLL 218 matches a time included in a time stamp of rate message 226). Rate adjustment unit 217 uses rate information from rate message 226 to adjust a rate of encoding unit 215. Encoding unit 215 encodes input signal 205 using the adjusted rate, and transmitter 212 transmits the encoded signal to multiplexer 230 in data message 222. Data message 222 can include a time stamp including, for example, information about the time (e.g., the time indicated by PLL 218) at which data message 222 is sent. The time stamp can be generated and added to data message 222 by transmitter 212.

Encoder 210 can include a rate queue (not shown) that stores rate information from rate message 226 and applies the rate information to a future transmission (e.g., data message 222) after a deterministic delay. The rate queue can compensate for a round-trip delay of encoder/multiplexer pair 200 so that, for example, a complexity message can be generated for a particular portion of data (e.g., a segment of input signal 205), the complexity message can be sent from the encoder to the multiplexer, a corresponding rate message can be sent from the multiplexer to the encoder, and the encoder can use the rate message to transmit the corresponding portion of data. By using a rate queue, encoder 210 can send the complexity message corresponding to the portion of data and can process one or more additional portions of data while waiting for the rate message corresponding to the first portion of data.

Multiplexer 230 receives data message 222 and multiplexes data contained in data message 222 with data from other encoders. In one implementation, input unit 232 can receive data message 222 and provide data message 222 to output assembly unit 238 at a specific time (e.g., when a time indicated by multiplexer clock 236 matches a time included in a time stamp of data message 222). If all encoders have responded to the rate messages sent by multiplexer 230, output assembly unit 238 can combine the data from all encoders into a multiplexer output stream 235. Output stream 235 can be a constant bitrate stream and can be, for example, transmitted over a communication link (e.g., a satellite link) to an end user or to a processing device.

The relationship between a time at which rate control unit 234 sends rate message 226 and a time at which output assembly unit 238 receives data message 222 typically is important. For example, if this "rate loop" is not properly synchronized, under-subscription or over-subscription can occur at the multiplexer. Synchronization of the rate loop can be influenced by two uncertainties: (i) an offset between the time indicated by PLL 218 and the time indicated by multiplexer clock 236 and (ii) variability in the delay of network 220. The offset between the time indicated at encoder 210 and the time indicated at multiplexer 230 typically can be bounded by maximum positive and negative offsets, which can depend on the design of PLL 218 and can be symmetric. The delay of network 220 typically can be bounded as well. For example, network 220 can offer a guaranteed quality of service, where network 220 delivers data within a specified amount of time (a maximum delay) with a certain (high) probability.

Once the time indicated by PLL 218 has been synchronized with the time indicated by multiplexer clock 236 to within a maximum offset (e.g., within the maximum positive and negative offsets), information about the maximum offset and the maximum network delay can be used to guarantee that a time-sensitive message sent from one component (the multiplexer or the encoder) to the other component arrives in time to be processed by the receiving component. For example, in one implementation a rate message is time-stamped with the time (as indicated by multiplexer clock 236) at which the rate message is sent ($time_{mux}$) plus the maximum network delay from the multiplexer to the encoder ($delay_{mux,enc}$) plus the maximum positive offset ($offset_{max+}$), where a positive offset indicates that the time indicated by PLL 218 is ahead of the time indicated by multiplexer clock 236. The time (as indicated by PLL 218, now) at which the rate message is received by the encoder ($time_{enc}$) is equal to or less than the time indicated by the time stamp, allowing the encoder to process the rate message at the time indicated by the time stamp.

In one implementation, a data message sent from encoder 210 to multiplexer 230 is time-stamped with the time (as indicated by PLL 218) at which the data message is sent ($time_{enc}$) plus the maximum network delay from the encoder to the multiplexer ($delay_{enc,mux}$) plus the maximum negative offset ($offset_{max-}$), where a negative offset indicates that the time indicated by PLL 218 is behind the time indicated by multiplexer clock 236. The time (as indicated multiplexer clock 236, now) at which the data message is received by the multiplexer ($time_{mux}$) is equal to or less than the time indicated by the time stamp, allowing multiplexer 230 to place the data in output stream 235 at the time indicated by the time stamp. Adjusting for the maximum offset and maximum network delay when transmitting messages between multiplexer 230 and encoder 210 allows the receiving component to receive a message in time to process the message when the time indicated by the receiving component matches the time stamp of the message.

The maximum offset of the encoder time base (e.g., of PLL 218) typically is larger than an allowed error in the delivery time of a message in a high-performance communication system. However, the offset of the encoder time base is cancelled in a round-trip transmission described herein. Because the offset is cancelled, very accurate system timing can be achieved. For example, if multiplexer 230 transmits a rate message at time t and expects data to arrive from encoder 210 at time t+constant+error where error=±50 μs, the required timing accuracy can be attained even if the maximum offset of the encoder time base or a variation in network delay is ±50 ms.

The time-stamping scheme described provides a constant round-trip delay between encoder 210 and multiplexer 230. For example, the delay between when multiplexer 230 sends a rate message and when multiplexer 230 places data having the corresponding bitrate in output stream 235 is a constant: $delay_{mux,enc}+offset_{max+}+delay_{processing}+delay_{enc,mux}+offset_{max-}$, where $delay_{processing}$ is a deterministic delay between when encoder 210 processes the rate message and when encoder 210 transmits data using the rate information from the rate message. In one implementation, other deterministic delays can be present, as well. Because the round-trip delay between each encoder and multiplexer 230 can be constant, multiplexer 230 can send rate messages to all encoders and receive data from the encoders at the requested rate substantially simultaneously, allowing multiplexer 230 to combine data from all encoders into a constant bitrate output stream 235 without over-subscribing or under-subscribing.

One possible time-stamping scheme was described above, but others are possible. For example, the component transmitting a message can time-stamp the message with the time the message was sent, as indicated by the time base of the transmitting component, and the receiving component can make adjustments, based on the maximum offset and maximum network delay, to determine a time, as indicated by the time base of the receiving component, at which the message should be processed. In one implementation, either the multiplexer or the encoder can adjust all time stamps for the maximum offset and maximum network delay. In one implementation, time stamps can include information, expressed in the transmitting component's time base, about a time at which the receiving component should process the message instead of, or along with, information about the time at which the message was transmitted. In one implementation, additional constants or variables can be added to account for processing delays or other delays in the communication system.

Referring to FIG. 2 and FIG. 3, FIG. 3 shows a process 300 for synchronizing messages over a stochastic network. A time of an encoder (e.g., encoder 210) is synchronized with a time of a multiplexer (e.g., multiplexer 230) to within a maximum offset (step 310). The times can be synchronized, for example, using a PLL, a variation of the Network Time Protocol, statistical methods, communication over a deterministic network (e.g., the public phone system), or a Global Positioning System (GPS) signal. Once the encoder time is synchronized to the multiplexer time, the encoder time typically will remain within the maximum offset of the multiplexer time during normal operation. If an offset between the encoder time and the multiplexer time exceeds the maximum offset, the times can be resynchronized.

A complexity message including information about the complexity of a signal at an input of the encoder optionally can be transmitted to the multiplexer (step 320). If a complexity message is transmitted, the complexity message may enable the multiplexer to make a better decision about subsequent rate allocations. The multiplexer transmits a rate message including a time stamp to the encoder (step 330) that can include information about a rate at which future data should be transmitted. In an implementation that includes a complexity message, the rate information subsequently can be applied to the data from which the complexity message was generated. The rate message time stamp can be used by the encoder to process the rate message at an appropriate time. The rate message time stamp also can be used to maintain synchronization between the encoder time and the multiplexer time.

The encoder receives the rate message and adjusts a data rate of output encoded data (step 340). For example, the encoder can adjust the output data rate by adjusting a level of compression applied to an encoder input signal or by varying the complexity of an encoding process. The encoder can change the output data rate when the encoder time matches a time determined using the rate message time stamp, or the encoder can place the corresponding data rate in a queue when the encoder time matches a time included in the rate message time stamp. In one implementation, the rate message time stamp includes information about when the rate message was sent, and the encoder processes the rate message at a time determined by adding a network delay and the maximum offset to the time at which the rate message was sent. In another implementation the rate message time stamp includes a time at which the encoder should process the rate message. In this implementation, the time stamp can include information about the network delay and the maximum offset.

The encoder transmits a data message including a time stamp to the multiplexer using the adjusted data rate (step 350). The multiplexer receives and processes the data included in the data message (step 360). The multiplexer can use the data message time stamp to determine when to place data from the data message in an output stream. In one implementation, data messages from multiple encoders that have similar time stamps (e.g., that were transmitted at similar times by the respective encoders) can be placed in the output stream together. In another implementation, the time stamp includes information about a network delay and a maximum offset and indicates at what multiplexer time the multiplexer should place the corresponding data in the output stream. In yet another implementation, the time stamp indicates the time at which the data message was sent, and the multiplexer uses the time stamp and information about the network delay and the maximum offset to determine when to place the data in the output stream.

Although process 300 has been described in the context of a multiplexer and an encoder, process 300 can be used in many situations in which components communicate over a stochastic network. In addition, although rate messages and data messages were used illustratively in the description, many types of messages can be synchronized using process 300.

A number of embodiments of the invention have been described. Nevertheless, it will be understood that various modifications may be made without departing from the spirit and scope of the invention. For example, time base synchronization and/or time stamping can be done by separate components. For example, PLL 218 and a time-stamping means (e.g., a buffer that adds a time stamp to a data packet) can be separate from encoder 210. A conventional encoder can then be retrofitted to interface with a stochastic network. In one implementation, rate control (rate control unit 234) is not physically part of multiplexer 230. Rate control unit 234 can, for example, communicate with multiplexer 230 using network 220 or a separate communication link. Accordingly, other embodiments are within the scope of the following claims.

What is claimed is:

1. A method for communicating between a local component and a remote component, the local component connected to the remote component using a non-deterministic communication link, a local clock of the local component synchronized with a remote clock of the remote component to within a maximum offset, the method comprising:
    receiving at a local component a rate message from a remote component, the rate message including a first time stamp;
    adjusting a data rate of the local component, using the rate message, when a first time of a local clock substantially matches a time determined using the first time stamp; and
    sending a data message at the first time from the local component to the remote component using the adjusted data rate, the data message including a second time stamp for use in processing data in the data message.

2. The method of claim 1, further comprising:
    transmitting a complexity message from the local component to the remote component, wherein the rate message is produced using the complexity message.

3. The method of claim 1 wherein adjusting the data rate includes determining the first time of the local clock using a phase-locked loop.

4. The method of claim 1 wherein adjusting the data rate includes statistically estimating the first time of the local clock.

5. The method of claim 1 wherein the time determined using the first time stamp is further determined using at least one of information about a communication link delay and information about an offset between the local clock and a remote clock.

6. The method of claim 5 wherein the information about an offset between the local clock and the remote clock includes information about a maximum offset between the local clock and the remote clock.

7. The method of claim 6 wherein the information about the maximum offset between the local clock and the remote clock includes information about a maximum positive offset and a maximum negative offset.

8. The method of claim 5 wherein the information about a communication link delay includes information about a maximum communication link delay between the local component and the remote component.

9. The method of claim 5 wherein the information about a communication link delay includes information about a communication link delay from the remote component to the local component and information about a communication link delay from the local component to the remote component.

10. The method of claim 5 wherein the first time stamp includes at least one of the information about the communication link delay and the information about the offset between the local clock and the remote clock.

11. The method of claim 1 wherein the second time stamp includes at least one of information about a communication link delay and information about an offset between the local clock and the remote clock.

12. The method of claim 1 wherein adjusting a data rate includes queuing rate information included in the rate message.

13. The method of claim 1, further comprising:
buffering the rate message until the first time of the local clock substantially matches the time determined using the first time stamp.

14. A method for communicating between a local component and a remote component, the local component connected to the remote component using a non-deterministic communication link, a local clock of the local component synchronized with a remote clock of the remote component to within a maximum offset, the method comprising:
sending to a remote component a rate message from a local component, the rate message including a first time stamp for use by the remote component to send a data message to the local component using a data rate included in the rate message when a first time of a remote clock substantially matches a time determined using the first time stamp;
receiving at the local component the data message, the data message including a second time stamp; and
processing data included in the data message using the second time stamp.

15. The method of claim 14, further comprising:
receiving a complexity message from the remote component; and
generating the rate message using the complexity message.

16. The method of claim 14 wherein processing data included in the data message includes processing data included in the data message when a second time of a local clock substantially matches a time determined using the second time stamp.

17. The method of claim 16 wherein the time determined using the second time stamp is further determined using at least one of information about a communication link delay and information about an offset between the local clock and the remote clock.

18. The method of claim 17 wherein the information about an offset between the local clock and the remote clock includes information about a maximum offset between the local clock and the remote clock.

19. The method of claim 18 wherein the information about the maximum offset between the local clock and the remote clock includes information about a maximum positive offset and a maximum negative offset.

20. The method of claim 17 wherein the information about a communication link delay includes information about a maximum communication link delay between the local component and the remote component.

21. The method of claim 17 wherein the information about a communication link delay includes information about a communication link delay from the remote component to the local component and information about a communication link delay from the local component to the remote component.

22. The method of claim 17 wherein the second time stamp includes at least one of the information about the communication link delay and the information about the offset between the local clock and the remote clock.

23. The method of claim 14 wherein the first time stamp includes at least one of information about a communication link delay and information about an offset between a local clock and the remote clock.

24. The method of claim 14 wherein processing data included in the data message includes buffering the data message until a second time of a local clock substantially matches a time determined using the second time stamp.

25. A method for communicating between a local component and a remote component, the method comprising:
providing a non-deterministic communication link connecting a local component to a remote component;
synchronizing to within a maximum offset a local clock of the local component with a remote clock of the remote component;
sending a rate message from the remote component to the local component, the rate message including a first time stamp;
adjusting a data rate of the local component using the rate message, when a first time of the local clock substantially matches a time determined using the first time stamp, information about a communication link delay, and information about the maximum offset;
sending a data message, at the first time, from the local component to the remote component using the adjusted data rate, the data message including a second time stamp; and
processing data included in the data message when a second time of the remote clock substantially matches a time determined using the second time stamp, information about the communication link delay, and information about the maximum offset.

26. The method of claim 25 wherein the local component is an encoder and the remote component is a multiplexer.

27. The method of claim 25, further comprising:
transmitting a complexity message from the local component to the remote component, wherein the rate message is produced using the complexity message.

28. A local component, the local component connected to a remote component using a non-deterministic communication link, the local component comprising:
means for synchronizing to within a maximum offset a local clock of a local component to a remote clock of a remote component;
means for adjusting a data rate of the local component using a rate message from the remote component, the rate message including a first time stamp, the means adjusting a data rate of the local component using the rate message when a time of a local clock substantially matches a time determined using the first time stamp; and
means for sending a data message from the local component to the remote component using the adjusted date rate that arrives at the remote component in time to be processed by the remote component.

29. The local component of claim 28 wherein the means for synchronizing include a phase-locked loop.

30. The local component of claim 28 wherein the means for synchronizing include statistical estimation.

31. The local component of claim 28 wherein the means for adjusting include a rate adjustment unit.

32. The local component of claim 28 wherein the means for sending include a time-stamping component.

33. A multiplexer comprising:
   an output assembly unit operable to assemble data into an output stream;
   an input unit operable to receive a data message including data and a time stamp and to provide the data to an output assembly unit when a time of a local clock substantially matches a time determined using the time stamp; and
   a rate control unit operable to send a time-stamped rate message to a remote component, the rate message including information about a data rate of a future data message.

34. The multiplexer of claim 33 wherein the rate control unit generates the rate message using information about a complexity of the future data message.

35. The multiplexer of claim 33 wherein the rate control unit timestamps the rate message using information about the time of the local clock.

36. The multiplexer of claim 33 wherein the input unit provides the data to the output assembly unit using at least one of information about a communication link delay and information about an offset between the local clock and a remote clock.

37. An encoder comprising:
   a synchronization unit operable to synchronize an encoder clock with a remote clock to within a maximum offset;
   a transmitter operable to time stamp and transmit a data message at a data rate; and
   a rate adjustment unit operable to adjust the data rate responsive to a corresponding rate message when a time of the encoder clock substantially matches a time determined using a time stamp in the corresponding rate message.

38. The encoder of claim 37 wherein the synchronization unit includes a phase-locked loop.

39. The encoder of claim 37 wherein the transmitter time stamps the data message using information about the time of the encoder clock.

40. The encoder of claim 37 wherein the rate adjustment unit adjusts the data rate using at least one of information about a communication link delay and information about the maximum offset.

41. The encoder of claim 37 wherein the transmitter transmits a timestamped complexity message that is used to generate the corresponding rate message.

42. The multiplexer of claim 33, where the data rate of the future data message is an adjusted data rate determined based on a data rate of the received data message.

\* \* \* \* \*

UNITED STATES PATENT AND TRADEMARK OFFICE
CERTIFICATE OF CORRECTION

| | | |
|---|---|---|
| PATENT NO. | : 7,660,366 B2 | Page 1 of 1 |
| APPLICATION NO. | : 10/931178 | |
| DATED | : February 9, 2010 | |
| INVENTOR(S) | : Picco et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1563 days.

Signed and Sealed this

Twenty-eighth Day of December, 2010

David J. Kappos
*Director of the United States Patent and Trademark Office*